(No Model.)

J. R. CONNON.
PHOTOGRAPHIC INSTRUMENT.

No. 369,165. Patented Aug. 30, 1887.

Witnesses.

Inventor.

UNITED STATES PATENT OFFICE.

JOHN R. CONNON, OF ELORA, ONTARIO, CANADA.

PHOTOGRAPHIC INSTRUMENT.

SPECIFICATION forming part of Letters Patent No. 369,165, dated August 30, 1887.

Application filed April 2, 1887. Serial No. 233,422. (No model.)

*To all whom it may concern:*

Be it known that I, JOHN ROBERT CONNON, of the village of Elora, in the county of Wellington, in the Province of Ontario, Canada, photographer, have invented certain new and useful Improvements in Photographic Instruments, of which the following is a specification.

The object of the invention is to arrange a photographic instrument by which a continuous panoramic view of any scene within a circle or portion of a circle may be produced; and it consists in the peculiar combinations and the novel construction, arrangement, and adaptation of parts, substantially as hereinafter more particularly explained.

Figure 1:
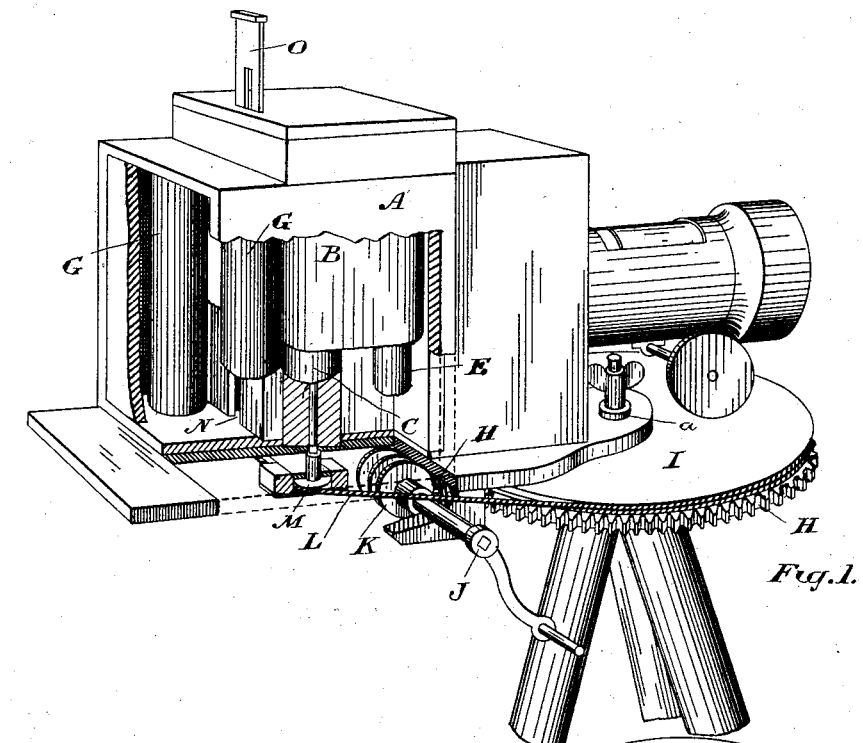
Figure 2:
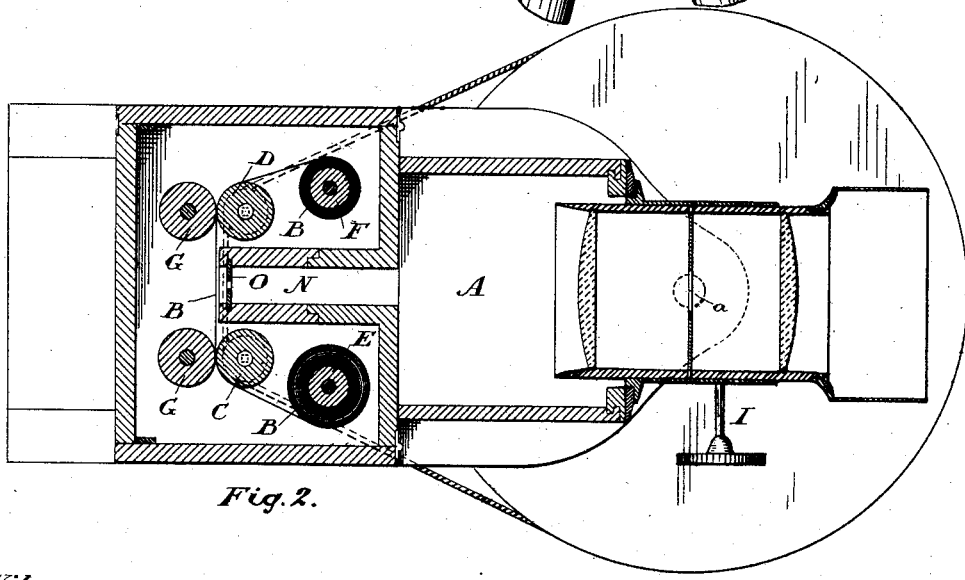

Figure 1 is a perspective view, partially in section, showing an instrument constructed in accordance with my invention. Fig. 2 is a sectional plan of the instrument.

The first point which must be observed is that the instrument A must be pivoted at *a*, which represents exactly the optical center or axis of the lens. It is also necessary that the sensitive film, whether it be placed on paper, B, glass, or any other substance, be placed on a radius struck from the optical center *a*.

In the drawings I show the sensitive paper, B, passing around the two rollers C D, which are located so as to hold the paper, B, at the proper distance from the optical center *a* mentioned. This paper, B, I store on the roller E, and as it leaves this roller, as hereinafter described, I wind it on the roller F, as hereinafter explained. The rollers G are merely friction-rollers for the purpose of holding the paper, B, against the rollers C D, as shown.

A spur-wheel, H, is fixed to the circular top I of the stand. A crank-handle, J, is journaled on the bottom of the instrument A, and has fixed to it a worm-pinion, K, which meshes with the spur-wheel H, as shown. Consequently the revolving of this crank-shaft J will cause the instrument A to revolve upon its pivot *a*. The circular top I is grooved, so as to receive the cord L, which passes around the circular top I and around pulleys M, fixed or attached to the spindle of the rollers C D. Consequently the said rollers must necessarily revolve with the instrument A, causing the paper B to leave the roller E, pass between the rollers C D, and be wound upon the roller F, this latter roller being provided with a suitable spring, so as to cause it to take up the slack paper, bringing into the focus of the lens a continuous supply of the sensitive film, so that a continuous panoramic image is produced on the sensitive paper as the instrument is revolved on its axis.

In order that only a small portion of the sensitive film shall be exposed to the action of the lens, I form a narrow vertical passage-way, N, located between the lens and its focus. As it may be sometimes desirable to reduce the width of this passage-way, I provide a slide, O, to fit into the passage-way N. In this slide I make a narrow vertical slit representing the exact width of the space on the sensitive paper which I wish to be exposed at any one time to the action of the lens.

From this description it will be seen that by arranging a photographic instrument as I have just described a complete panoramic and continuous view may be secured at one exposure of the entire country embraced within a circle.

What I claim as my invention is—

1. The combination, with the stand I, provided with spur-wheel H and groove, as described, of the photographic instrument pivoted at *a* to said stand, the rollers C D, crank J, worm-pinion K, and cord L, all substantially as and for the purpose specified.

2. The combination, with the stand provided with spur-wheel and groove, as described, and the photographic instrument pivoted at *a* to said stand, of the crank J and pinion K on said instrument, the rollers C D E F, the pulleys M on the spindles of the rollers C D, and the cord L, passed around said pulleys and seated in the groove of said stand, substantially as and for the purpose specified.

Elora, March 21, 1887.

JOHN R. CONNON.

In presence of—
EDWARD S. SHEPPARD,
ANDREW SPALDING.